United States Patent [19]

Lytton et al.

[11] 4,402,643
[45] Sep. 6, 1983

[54] CATALYST LOADER

[75] Inventors: Irvin V. Lytton, Dickinson, Tex.; Billy B. Burgin, Starks, La.

[73] Assignee: PPG Industries, Inc., Pittsburgh, Pa.

[21] Appl. No.: 235,452

[22] Filed: Feb. 18, 1981

[51] Int. Cl.³ .................... B65G 27/16; B01J 2/18
[52] U.S. Cl. ........................... 414/160; 222/196; 414/162; 414/187; 414/198; 422/219
[58] Field of Search ............ 414/160, 162, 187, 198, 414/208, 269; 222/196, 199, 200; 221/200, 202, 204, 183, 184; 422/219, 201; 406/75; 193/14; 198/771, 445, 446, 769, 540, 565

[56] References Cited

U.S. PATENT DOCUMENTS

| | | | |
|---|---|---|---|
| 2,273,330 | 10/1938 | Robinson | 221/118 |
| 2,301,136 | 2/1939 | Moreland et al. | 221/118 |
| 2,323,864 | 5/1939 | Weyandt | 221/118 |
| 2,568,332 | 4/1946 | Genovese | 222/56 |
| 2,610,726 | 7/1949 | Howard | 193/62 |
| 2,632,588 | 1/1952 | Hoar, Jr. | 226/2 |
| 2,948,437 | 8/1960 | Nielsen | 222/196 |
| 3,223,490 | 2/1962 | Sacken et al. | 23/288 |
| 3,305,067 | 2/1967 | Mayer | 198/771 |
| 3,391,833 | 1/1967 | Plura | 222/200 |
| 3,777,874 | 12/1973 | Birckhead | 406/75 |
| 4,046,285 | 9/1977 | Wendt | 221/204 |
| 4,173,188 | 11/1979 | Pearce | 406/75 |
| 4,362,236 | 12/1982 | Hedel | 198/446 |

OTHER PUBLICATIONS

Vibratory Feeders Catalog, pp. 1-8.

Eriez Vibratory Feeders Catalog, pp. 1-8, 1977.

Primary Examiner—Robert B. Reeves
Assistant Examiner—Donald Hajec
Attorney, Agent, or Firm—Irwin Stein

[57] ABSTRACT

Apparatus for charging granular catalyst, e.g., cylindrically shaped catalyst, into a multiplicity of elongated reactor tubes is described. The apparatus comprises, in combination, a plurality of contiguously arranged storage hoppers arranged in a bundle and disposed above a substantially horizontal vibratory feeder tray having a plurality of V-shaped open troughs equal in number to the number of storage hoppers. Each trough has a discharge opening at its forward end for delivering the catalyst to a discharge spout affixed to the bottom of the feeder tray and communicating with the discharge opening in the trough. Flexible elongated tubular conduits are attached to each discharge spout and rigid nozzle means attached to the end of each flexible tubular conduit. The nozzle is adapted for insertion into the top of the reactor tube. Electrical vibrating means are mechanically connected to the feeder tray.

In operation, a predetermined quantity of catalyst is charged to each of the storage hoppers. The nozzle attached to the end of each flexible tubular conduit is inserted into the top of a reactor tube and the vibrator activated. Granular catalyst particles travel forwardly along the bottom of the V-shaped trough substantially one particle at a time and are discharged into the flexible tubular conduit and thence into the reactor tube.

19 Claims, 5 Drawing Figures

CATALYST LOADER

DESCRIPTION OF THE INVENTION

The present invention relates to apparatus for filling elongated tubes of relatively small diameter with particulate granules that are of a size which can result in bridging within the tubes during the loading process. More particularly, the present invention relates to apparatus for filling elongated reactor tubes with pellets of cylindrically-shaped catalyst.

Many reactors, e.g., of the fixed-bed reactor type, are in essence a shell and tube exchanger containing a multiplicity of elongated tubes. These tubes are filled with a large number of small particulate catalyst granules or pellets. These catalyst granules must be evenly distributed within and completely fill each tube to avoid empty spaces therein. Such empty spaces can result in hot spots in the tube and, as a result, hot spots within the reactor. In view of the very large number of reactor tubes typically found in a reactor of the aforesaid type, speed in loading of the reactor with a new charge of catalyst is imperative for maintaining a high level of reactor on-stream time and, hence, improved production capacity.

The diameter of the elongated reactor tube is relatively small, e.g., one-inch O.D. (outside diameter), and it is essential that the catalyst pellets enter the tube in such a manner, e.g., one at a time, that bridging of the catalyst within the tube does not occur. Bridging results in an unevenly and incompletely loaded reactor tube and occurs when several catalyst pellets, entering and falling down into the tube simultaneously, wedge together partway down the tube and leave a void space in the tube between the bridged pellets and the column of catalyst pellets below the bridge.

It is an object of the present invention to speed up the loading of a reactor composed of a multiplicity of elongated tubes with particulate catalyst.

Another object is to eliminate bridging of catalyst during loading of the reactor tubes.

A further object of the present invention is to insure a uniform distribution and loading of catalyst within each reactor tube making up the reactor tubular bundle.

An additional object is to develop a catalyst loader which is simple to construct and can be efficiently operated.

The present invention consists of certain novel features of construction, arrangement, and combination of parts as hereinafter fully described and/or illustrated in the accompanying drawings and description, and more particularly pointed out in the appended claims. For the purpose of facilitating and understanding the invention, there is illustrated in the accompanying drawings a preferred embodiment thereof. While one form of the invention is described in considerable detail in connection with the drawings, it will be understood by those skilled in the art that numerous modifications and variations there will be apparent to those skilled in the art. The aforesaid preferred embodiment is intended as illustrative only.

BRIEF DESCRIPTION OF THE DRAWINGS

The invention may be more fully understood by reference to the accompanying drawings, in which.

DETAILED DESCRIPTION OF THE INVENTION

The present invention is directed to a novel catalyst loading device which will load the tubes of a tubular reactor quickly and easily with a predetermined amount of catalyst without bridging of the catalyst particles within the reactor tubes. In the loading of tubular reactors for conducting catalytic chemical reactions, it is required that each tube be completely filled with catalyst to the desired height without void spaces caused by bridging of catalyst particles within the reactor tubes. Such void spaces can become overheated during performance of the chemical reaction, i.e., form hot spots, and can cause reactor operational problems.

It is not uncommon for a tubular reactor of the aforementioned type to contain in excess of 6,000 small diameter, elongated tubes of, for example, 300 inches in length and a one inch outside diameter. When the catalyst is a finely divided powder or particle which does not occupy a significant portion of the inside diameter of the reactor tube, the catalyst can be loaded easily into the tubes by, for example, sweeping the catalyst into the tubes for the reason that bridging is not a problem. However, when the catalyst is irregular in shape and/or occupies a significant portion of the inside diameter of the reactor tube, e.g., pellets of $\frac{3}{8}-\frac{1}{2}$ inch length $\times$ $\frac{3}{8}$ inch diameter being loaded into a reactor tube having an inside diameter of about $\frac{7}{8}$ inch, bridging of the catalyst in the reactor tubes can be a serious problem.

The catalyst loader of the present invention is designed to load granular particles of catalyst having a significant particle size relative to the inside diameter of the reactor tube into which the catalyst particles are introduced. By significant particle size is meant that the particles are of such size that bridging of the catalyst particles within the reactor tube can occur and is to be distinguished from powdery material or very small granules. The granular catalyst particle can be in the form of spheres, pellets, cylinders, or other geometric shapes, or even of irregular shape.

Figures 1, 3:
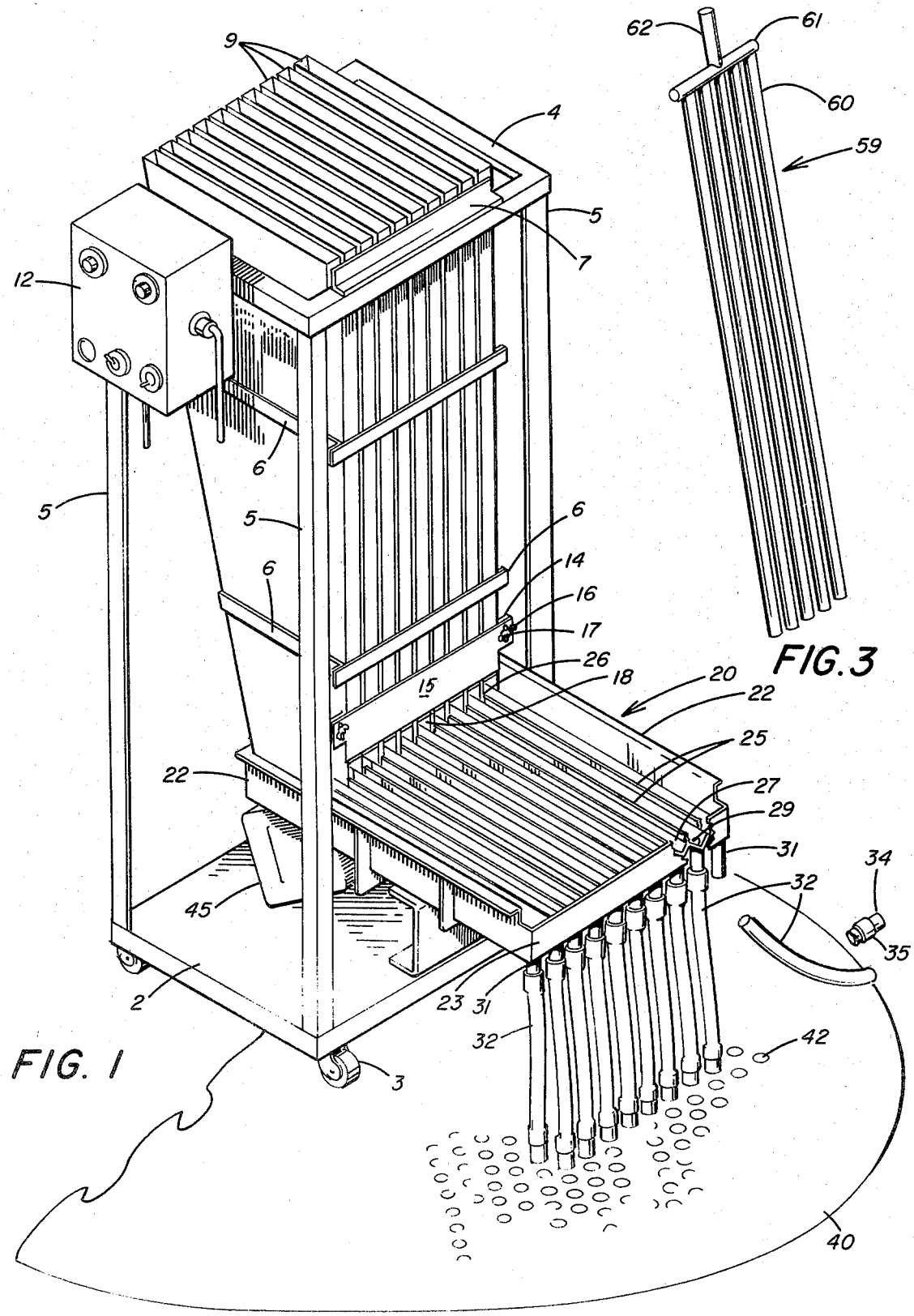
FIG. 1 is an isometric perspective view of a preferred embodiment of the catalyst loader of the present invention mounted on a suitable frame provided with casters.
FIG. 3 is an isometric perspective view of a rake used to clear the hoppers of the catalyst loader depicted in FIG. 1.
Figure 2:
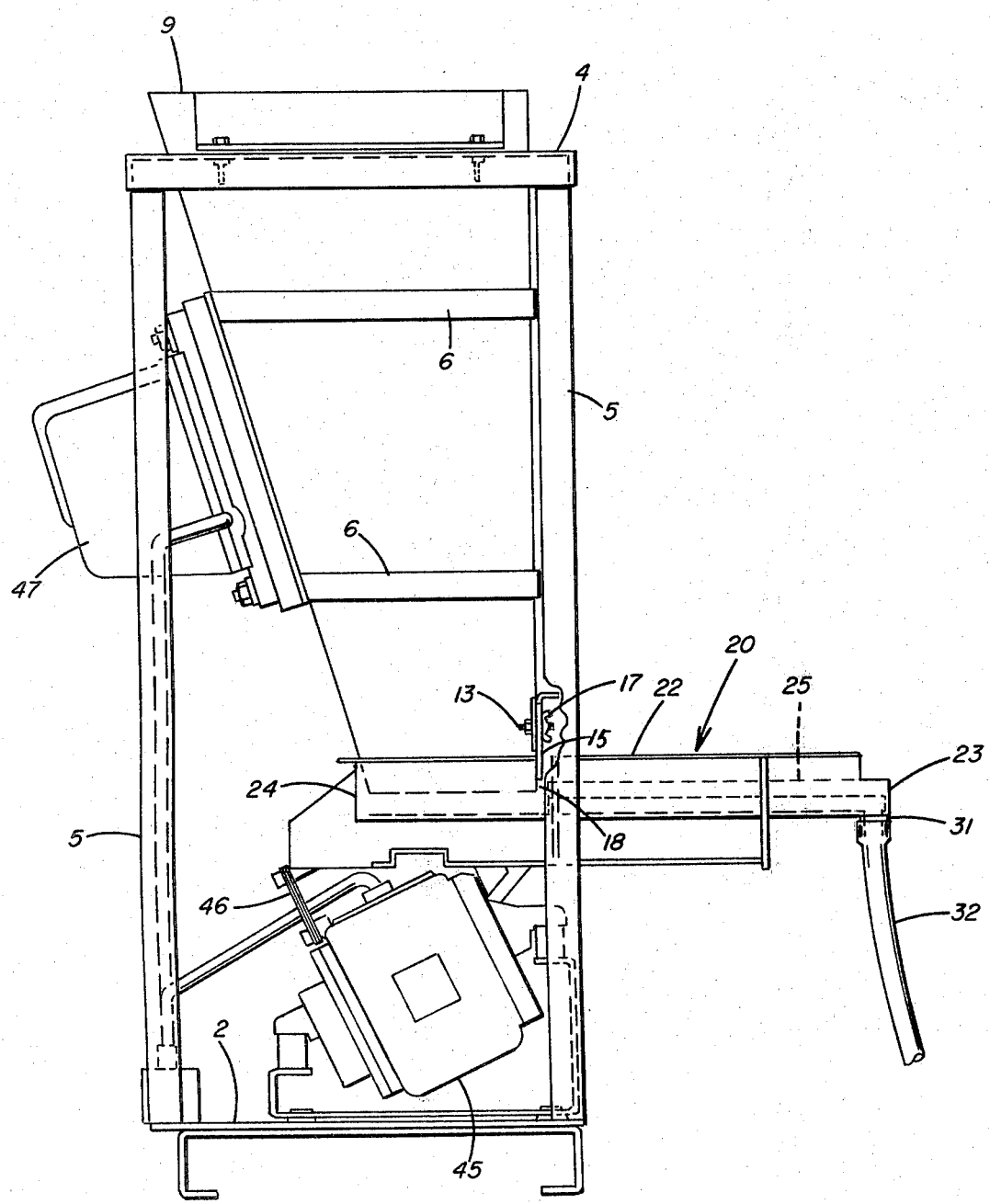
FIG. 2 is a side elevation view of FIG. 1.

The catalyst loading device of the present invention provides a means for avoiding bridging of catalyst particles of significant size during loading of such catalyst in elongated reactor tubes. Referring now to the drawings and in particular to FIG. 1, there is shown an isometric perspective view of a preferred embodiment of the catalyst loader device of the present invention. In particular, there are shown a plurality of contiguously arranged hollow, asymmetric rectangular storage hoppers 9. The hoppers are bound together into a bundle with bands 6, which can be attached to the hoppers by any convenient technique, e.g., by welding. The bundle of hoppers are mounted on a suitable supporting frame comprising a top bar 4, legs 5, and a bottom table 2. The catalyst loader is provided with mobility by means of four caster wheels 3 mounted on the bottom of table 2 at the four corners thereof in a conventional manner. The bundle of hoppers is fixed to the top bar 4 of the frame by means of right angle plate 7, which is affixed to the hoppers 9 and top bar 4 of the frame by conventional means, e.g., by being bolted or welded to the top bar 4 and welded to the hoppers.

As shown in FIG. 1, ten hoppers 9 are arranged in a bundle which is disposed substantially vertically in the supporting frame. The number of hoppers in the bundle is not critical, and more or less than ten hoppers can be used. The larger the number of hoppers, the heavier the catalyst loader, and the more difficult it is to move the device. The inside of each hopper is hollow and preferably has a relatively smooth interior surface free of grooves or projections which might tend to permit catalyst particles to hang up on the inside walls of the hopper.

The hoppers 9 shown in FIG. 1 are hollow asymmetric, elongated, narrow rectangular boxes in which the top opening or charging end is larger than the bottom opening or discharge end. One side of the hopper is shown as being vertical. The other side, preferably, the rear side, is sloped. The particular shape of the hopper is not critical to the function of the catalyst loader. Thus the hoppers can be of any geometric shape or size, e.g., they can be funnel-shape, circular, rectangular, symmetrically rectangular, etc.

The capacity of each hopper is sufficiently large to contain or hold at least the quantity of catalyst required for the loading of a single reactor tube. In practice, a premeasured, predetermined quantity of catalyst, i.e., the amount required to fill the reactor tube to the desired level is loaded into each of the ten hoppers of the catalyst loader by means of hopper loading funnels 1 shown in FIG. 4. Following charging of the catalyst to the reactor tubes, as described hereinafter, it can be readily ascertained whether bridging has occurred and in which tube. Thus, if any catalyst remains in either a hopper or a trough associated with each of the hoppers (as described hereinafter), it can be seen immediately that the reactor tube associated with the hopper(s) or trough(s) does not contain a complete charge of catalyst.

Figure 4:
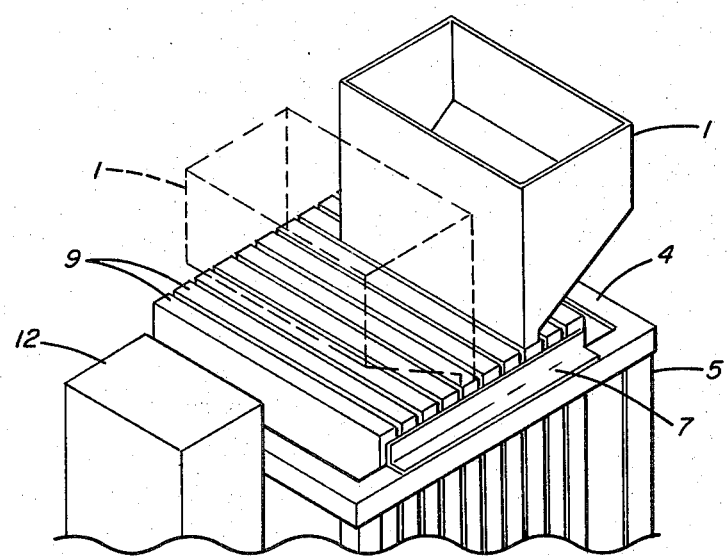
FIG. 4 is an isometric perspective view of the top of the catalyst loader of FIG. 1 also illustrating loading funnels (one in phantom) for the hoppers of the catalyst loader.

The catalyst loader device can be charged from both sides by the use of hopper-loading funnels 1, as shown in FIG. 4. One such loading funnel is illustrated in phantom. The discharge end of funnels 1 are smaller than the top openings in storage hoppers 9. As shown in FIG. 4, the lip (discharge end) of the funnel 1 is placed in the top of the hopper. This arrangement allows only proper sized catalyst to be charged to the hoppers and avoids the introduction thereto to over-sized catalyst particles and foreign matter. In practice, the hoppers are loaded from both sides of the device by utilizing two loading funnels (starting at both ends and working toward the center or starting at the center and working outwardly) and by introducing into the loading funnel the predetermined, premeasured quantity of catalyst required to be loaded in each of the reactor tubes. The catalyst particles charged to the hopper fall by means of gravity and form a substantially vertical column of catalyst in the hopper, the bottom of each column of catalyst resting in a substantially horizontal trough contained in feeder tray 20 disposed and aligned below the discharge end of the storage hopper.

The bottom front side of each storage hopper has a mouth 18 through which catalyst is discharged from the hopper into troughs 27 of the feeder tray during operation of the catalyst loader. The amount of catalyst passing through the mouths 18 of the hopper 9 can be regulated, if desired, by means of vertically adjustable gate 15. Gate 15 can be mounted in any conventional manner. As shown, elongated holes 16 are provided in side extensions of gate 15. A flange 14 with a bolt 13 is provided on either side of the two outside hoppers making up the bundle to align with the elongated holes 16 in the side extensions of gate 15. The height of gate 15 is regulated by manually adjusting the gate to the desired height and fixing it in place with a nut, such as wing nut 17. Gate 15 can cover totally mouths 18 of the hoppers by allowing it to fall completely into depressions 26 in the side walls 25 to the top of troughs 27. Thus, the gate can be vertically positioned to permit one or more catalyst particles to be discharged from the mouths of the hoppers, thereby regulating the flow of catalyst particles into the troughs. Gate 15 can however be eliminated entirely, if desired, and the catalyst feed rate regulated by vibrator means 45, as described later.

Vibratory feeder tray 20 is disposed substantially horizontally below the discharge end of hoppers 9. Feeder tray 20 is composed of side walls 22, front wall 23, and back wall 24. The tray contains a plurality of troughs, e.g., V-shaped troughs 27, having side walls 25. Each trough has a discharge opening or orifice 29 in the bottom of the trough at its forward end, i.e., the end adjacent to front wall 23 of the feeder tray, for delivering the catalyst to spout 31. The diameter of orifice 29 is so selected as to permit only one or two catalyst particles to enter discharge spout 31 at any instant and then to fall into conduit 32 and reactor tube 42, thereby eliminating the possibility of catalyst bridging in the reactor tubes.

The discharge end of each hopper 9 is proximate to but, spaced from the trough 27 that is aligned with and disposed below that discharge end. The sidewalls of each hopper are spaced from the trough immediately below it to permit vibrational free movement of the feeder tray, e.g., horizontal motion; but, is sufficiently close to prevent catalyst particles from moving to adjacent troughs. The side walls 25 of the troughs can be extended beyond depression 26, e.g., all or part of the way to back wall 24 of the feeder tray to insure separation of the catalyst charges introduced into each of the respective hoppers.

While troughs 27 of feeder tray 20 are shown as being open (uncovered), it is possible for them to be covered. However, it is preferred that the troughs are open so that the catalyst loader operator can visually observe the catalyst particles as they proceed across the feeder tray. If the troughs are covered and the amplitude of vibration is too high, bridging of catalyst can occur within the troughs. With the troughs open, the operator can adjust vibrator means 45 in response to a visual inspection of the catalyst particles as they proceed across the feeder tray, and regulate the speed of catalyst movement, i.e., faster or slower as required. In operation, the catalyst particles are advanced uniformly along the troughs and delivered in a constant and uniform stream from the discharge end of the vibratory feed tray.

Although the feeder tray is shown in a substantially horizontal position, it is possible for the tray to be disposed in an upwardly inclined plane of up to about 20° from the horizontal. It is intended that the term substantially horizontal include such enclosed angles. It is not recommended that the feeder tray be inclined downwardly for the reason that the catalyst particles would move of their own accord by means of gravity and tend to plug the discharge opening in the forward end of the feeder trough or be thrown out of the front end of the feeder tray.

Discharge spouts 31 are affixed to the bottom of the feeder tray by a convenient technique. The discharge spouts are usually rigid, and are preferably disposed in a substantially vertical mode, i.e., perpendicular to the feeder tray, although other positioning modes can be used. Discharge spouts 31 are hollow and openly communicate with the discharge openings 29 in the front end of the V-shaped troughs 27.

Attached to each discharge spout 31 is flexible, elongated, tubular conduit means 32 for further transport of the catalyst particle. Flexible tubes 32 can be constructed of any suitable plastic or rubbery material, e.g., Tygon plastic tubing, which will permit movement of the hose in any direction to permit positioning of nozzle means 34 into the top of a reactor tube 42 in the tube sheet 40. It is not required that the flexible tubular conduit means, e.g., a hose, be transparent; but, it is initially helpful if that is the case. However, the conduit will become opaque eventually due to a coating of dust from the catalyst particles.

Conduit means 32 are shown in FIG. 1 attached to spouts 31 by having one elastic end of the conduit slipped over the discharge end of spout 31; however, any means of attachment can be employed. It is convenient to use a thermoplastic material for conduit 32 so that it can be rendered elastic with heat and more easily slipped over the end of spout 31. When the conduit cools, it will adhere tightly to the spout. The discharge end of conduit means 32 is connected to nozzle means 34, which is a nipple having a collar 35. One end of each nozzle is affixed to the discharge end of a conduit 32 by any convenient technique. As shown, the diameter of nozzle means 34 is slightly smaller than the diameter of conduit means 32 so that the nozzle can be slipped easily but securely into the end of conduit 32, where it is held tightly. The other end of nozzles 34 are of smaller diameter than the reactor tubes and are inserted loosely into the top open ends of reactor tubes 42 in reactor tube sheet 40 a sufficient distance to insure that the nozzles remain in the reactor tubes during loading of the catalyst. When loading is completed, the portion of the nozzle placed in the reactor tube is removed and the loading device moved to a position above ten unfilled reactor tubes.

Vibrating means 45 is mechanically connected to feeder tray 20 for imparting vibrational movement to the tray and thereby move the catalyst particles exiting from the mouths of the hoppers across the troughs to the discharge openings therein and thence into the reactor tubes via the discharge spouts, flexible conduits, and nozzle means. The particular vibrating means used to propel the catalyst particles forward along the trough of the feeder tray is not critical to the invention. Thus, any conventional vibrating means, e.g., electrical vibrating means, can be used. Preferably, vibrating means which oscillate or reciprocate the feeder tray in a substantially horizontal plane is used. In particular, vibrating means such as described in U.S. Pat. No. 2,323,864 are used. The vibrating means described therein utilizes an electromagnetic force set up in a magnet to propel the feeder tray in a forward direction and against the resilient resistance of springs 46 mechanically attached to the feeder tray. When current to the electromagnet is halted, the build-up restoring force in the springs retracts the feeder tray to its original position. The action is one of successively advancing catalyst particles by a forward vibratory movement of the feeder tray followed by a more rapid withdrawal of the feeder tray from under the catalyst particles, thereby advancing the catalyst particles continuously in one direction. There is thus set up a vibratory motion which moves the feeder tray with a vibratory motion and any material placed on the trough will be conveyed continuously in one direction. The amplitude of the frequency at which the feeder tray is vibrated is regulated by means of control panel 12 on which are placed the other electrical control means, e.g., on-off switches. The amplitude of vibration controls the speed at which the catalyst particles are conveyed by controlling the distance that the feeder tray moves during each vibrational movement.

In addition to vibrating means 45 shown in FIG. 1, there is also provided vibrating means 47, which is attached, e.g., to the backside, of hoppers 9 to provide vibratory motion to the hoppers in the event that bridging of catalyst occurs in any of the hoppers. In contrast to vibrating means 45, which is operated continuously during loading, vibrating means 47 is operated intermittently, if at all, when it is necessary to dislodge catalyst particles hung up in the hoppers.

Alternatively, there is shown in FIG. 3 a hopper clearing rake 59 composed of a plurality, e.g., five, of tubular fingers 60 affixed to a transverse tubular bar 61, which has a handle 62. The fingers of rake 59 are approximately the height of the hoppers 9. In practice, the rake is positioned along the sloping backside of the hopper and is moved forward by means of handle 62 to dislodge any catalyst particles in the hoppers. Where, as in FIG. 1, ten hoppers are formed into a bundle, two hopper clearing rakes can be used. If desired, the hopper clearing rake can contain as many fingers as there are hoppers; but, for ease of manipulation, a rake with only five fingers has been used.

Figure 5:
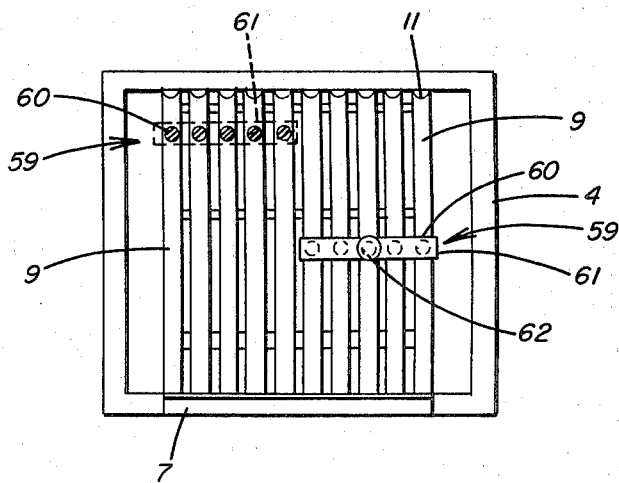
FIG. 5 is a top plan view of the top of a catalyst loader similar to that depicted in FIG. 1 but with the rear side of the hopper being hemispherical, and also showing the fingers of one rake in section and a top plan view of a second rake in the middle of the hoppers.

Referring to FIG. 5, there is shown a top plan view of a catalyst loader in which the back (sloping) side 11 of each hopper is hemispherical in shape. The use of a hemispherical shape assists in avoiding bridging of catalyst along the sloping straight rear end wall of the hopper. Also shown in FIG. 4 are two hopper clearing rakes disposed in the hoppers, one in section showing the fingers of the rake and the other in top plan view.

In operation, the catalyst loader is positioned on top of a tubular reactor (usually on a metal plate) and the ten nozzles that are affixed to the flexible tubular conduits 32 inserted into ten reactor tubes, e.g., ten tubes in a straight line. Hoppers 9 are loaded—each with the required charge of catalyst for each reactor tube, usually with the assistance of hopper loading funnels 1. Vibrator 45 is then turned on. The frequency at which vibrating means 45 is operated is such that the catalyst particles in the hoppers are discharged through the mouths 18 of the hoppers into the troughs aligned therewith and advance one or two at a time uniformly along the feeder tray until they are delivered to the openings 29 in the discharge end of the feeder tray. The catalyst particles then fall by gravity substantially one at a time through spouts 31, flexible tubes 32, and nozzles 34 into reactor tubes 42. Since the catalyst particles fall substantially one at a time through flexible conduits 32, briding of catalyst within reactor tubes 42 is virtually eliminated.

The catalyst loader of the present invention can be fabricated of any suitable construction material, e.g., mild steel, stainless steel, etc. that is sturdy and will not abrade significantly during use and thereby contaminate the catalyst being loaded.

The catalyst loading device depicted in FIG. 1 was used to load a tubular ethylene oxide reactor with silver-containing catalyst pellets approximately $\frac{3}{8}$ inch in diameter by $\frac{3}{8}$ to $\frac{1}{2}$ inch in length into a tubular reactor containing 6,740 tubes of about 1 inch O.D. and about $\frac{7}{8}$ inch I.D. It was found that ten tubes could be loaded in the manner described hereinabove in from about 4 to 8 minutes and typically in an average of about 6 minutes. To load such tubes evenly and completely with that size catalyst by other known means would require a much longer length of time.

Although the present process has been described with reference to specific details of certain embodiments thereof, it is not intended that such details should be regarded as limitations upon the scope of the invention except as and to the extent that they are included in the accompanying claims.

We claim:

1. Apparatus for charging granular catalyst into a multiplicity of reactor tubes, comprising, in combination:
   (a) a plurality of contiguously arranged storage hoppers for containing the granular catalyst, each such hopper having a capacity to hold at least a predetermined quantity of catalyst;
   (b) a substantially horizontal vibratory feeder tray having side walls, a back wall, and front wall disposed below said hoppers, said feeder tray having a plurality of V-shaped troughs equal in number to the number of storage hoppers, the discharge end of each such hopper being proximate to and aligned with but spaced from the trough disposed therebelow, each trough having a discharge opening at its forward end adjacent to the front wall of the feeder tray for delivering the catalyst;
   (c) discharge spouts attached to the bottom of the feeder tray which openly communicate with the discharge openings in the feeder tray;
   (d) flexible, elongated tubular conduit means attached to each discharge spout;
   (e) nozzle means attached to the discharge end of each of the flexible tubular conduit means and adapted to being inserted into the top of the reactor tube; and
   (f) vibratory means mechanically connected to said feeder tray for vibrating said tray, thereby to convey the grandular catalyst along the troughs to the discharge openings therein.

2. The apparatus of claim 1 wherein the storage hoppers are hollow, asymmetric, narrow rectangular boxes in which the top opening is larger than the bottom opening.

3. The apparatus of claim 2 wherein at least one side of the storage hopper is sloped.

4. The apparatus of claim 2 wherein one side of the storage hopper is substantially vertical and the other side is sloped.

5. The apparatus of claims 3 or 4 wherein the inside of the sloped side of the storage hopper is hemispherical.

6. The apparatus of claim 2 wherein the bottom front side of the storage hopper has a mouth for discharging catalyst into the trough of the feeder tray.

7. The apparatus of claim 6 wherein a vertically adjustable gate is provided to cover the mouth in the front side of the storage hopper.

8. The apparatus of claim 1 wherein the discharge spouts are substantially perpendicular to the feeder tray.

9. The apparatus of claim 1 wherein the vibrating means oscillates the feeder tray in a substantially horizontal plane.

10. The apparatus of claim 1 wherein there is provided electrical control means for vibrating the feeder tray at a variable rate.

11. The apparatus of claim 1 wherein the discharge end of each storage hopper terminates below the level of the side wall of the trough disposed therebelow.

12. The apparatus of claim 1 wherein the troughs are open.

13. The apparatus of claim 1 wherein there is provided further a supporting frame for mounting the apparatus and caster wheels attached to the bottom of the frame for mobility.

14. Apparatus for charging catalyst particles into a multiplicity of elongated reactor tubes, comprising, in combination:
   (a) a plurality of contiguously arranged hollow, asymmetric, rectangular storage hoppers arranged in a bundle, the charging end of said hoppers being larger than the discharge end, each such hopper having a capacity to hold at least a predetermined quantity of catalyst;
   (b) a substantially horizontal vibratory feeder tray having side walls, a back wall, and front wall disposed below said bundle of hoppers, said feeder tray having a plurality of V-shaped open troughs equal in number to the number of storage hoppers, the discharge end of each such hopper being proximate to and aligned with but spaced from the trough disposed therebelow, each trough having a discharge opening at its forward end adjacent to the front wall of the feeder tray for delivering the catalyst;
   (c) substantially vertical discharge spouts attached to the bottom of the feeder tray which openly communicate with the discharge openings in the feeder tray;
   (d) flexible, elongated tubular conduit means attached to each discharge spout;
   (e) rigid nozzle means attached to the discharge end of each of the flexible tubular conduit means and adapted to being inserted into the top of the reactor tube; and
   (f) electrical vibratory means mechanically connected to said feeder tray for vibrating said tray, thereby to convey the catalyst particles along the troughs to the discharge openings therein.

15. The apparatus of claim 14 wherein the bottom front side of the storage hopper has a square-shaped mouth for discharging catalyst into the trough of the feeder tray.

16. The apparatus of claim 15 wherein there is provided further a vertically adjustable gate to cover said mouth.

17. The apparatus of claims 14 or 15 wherein the feeder tray oscillates in a substantially horizontal plane.

18. The apparatus of claim 17 wherein the discharge end of each storage hopper terminates below the level of the side wall of the trough.

19. A method for charging granular catalyst into a multiplicity of elongated reactor tubes, which comprises
(a) charging a premeasured quantity of said catalyst granules to each of a plurality of contiguously disposed storage hoppers arranged above a substantially horizontal feeder tray having a plurality of V-shaped troughs equal in number to the number of storage hoppers, said premeasured quantity of catalyst being sufficient to fill one of said elongated reactor tubes, each of said storage hoppers having a discharge opening proximate to and aligned with but spaced from the back end of the V-shaped trough disposed therebelow;
(b) vibrating said feeder tray at a frequency sufficient to convey the catalyst granules uniformly along the V-shaped troughs of the feeder tray to discharge openings in the front end of the troughs;
(c) providing a flexible tubular conduit between each of the said discharge openings in said troughs and a reactor tube, and
(d) forwarding catalyst granules substantially one at time through said discharge openings in the troughs and flexible tubular conduits into the reactor tubes.

* * * * *